Jan. 20, 1970     W. P. DE STOUTZ     3,491,007
METHOD FOR INCREASING THE VITAMIN D CONTENT OF YEAST
Filed March 15, 1967
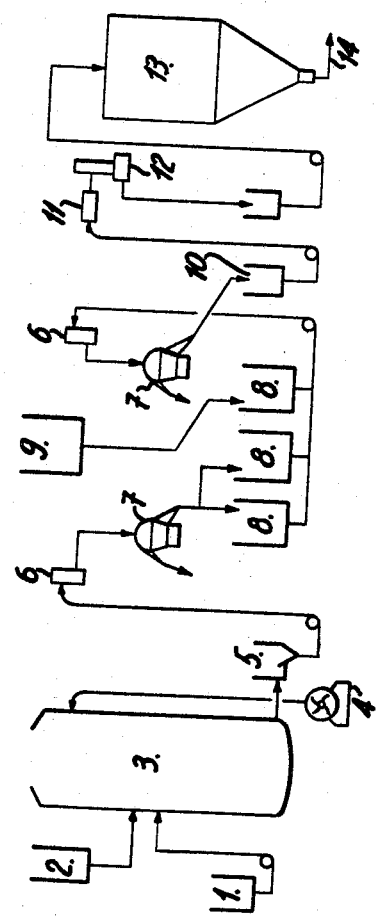
INVENTOR
WILLIAM PATRICK DE STOUTZ
By Young + Thompson
ATTYS.

United States Patent Office 3,491,007
Patented Jan. 20, 1970

3,491,007
METHOD FOR INCREASING THE VITAMIN D CONTENT OF YEAST
William Patrick de Stoutz, Larringes-sur-Evian, Haute-Savoie, France
Filed Mar. 15, 1967, Ser. No. 623,429
Int. Cl. B01j 1/10
U.S. Cl. 204—159                               2 Claims

ABSTRACT OF THE DISCLOSURE

This invention concerns a method for increasing the yield in vitamin D of yeasts. This enrichment is obtained by irradiation of a yeast paste comprising 5 to 30% of dry material at a temperature of 25 to 45° C., by means of ultra-violet rays of a wave length of 2537 Angstroms. Furthermore, a turbulent flow of the yeast paste is made to take place during the irradiation.

---

Vitamin D is known to be an important dietary supplement for humans and animals, but its production and recovery are attended by numerous difficulties. In fact it is first necessary to extract this vitamin D for example from yeasts, which presents certain difficulties. It is particularly necessary to create cultures of yeasts, then to extract the provitamins D, to irradiate them by means of ultra-violet rays of a wave length of 2700 Angstroms or more, and to cause the transformation of these provitamins into vitamins D. This irradiation has to be continued for twelve hours to obtain a sufficient efficiency of this transformation.

This way of doing it presents drawbacks the main ones of which are the following:

(a) The necessity to extract the provitamins from the culture of yeast, which is always a difficult and onerous operation.

(b) The irradiation of the isolated provitamins which has to be done for several hours which is very annoying. Further, it is admitted that during this irradiation the transformation of the provitamins is made through several stages before the obtention of vitamins D. Among others the ergosterol is transformed into lumisterol, then into tachysterol before the formation of vitamin $D_2$.

The product obtained by irradiation is thus never pure vitamin $D_2$ but a mixture of this vitamin $D_2$ with lumisterol and tachysterol which does not show any of the wanted properties and which may even be toxic.

(c) The crystallized vitamin $D_2$ obtained in this way is incorporated in food or fodder only under great difficulties. In fact, this vitamin is soluble only in alcohol or certain oils. Further, this product being very concentrated, 1 gram of crystallized vitamin D equal $40.10^6$ international units of vitamin D, and it is very difficult to realize a homogeneous dilution of it to obtain a food or fodder comprising a dosage of the order of 1000 international units of vitamin D per liter of kilogram, which concentration has been recognized as the optimum for the feeding of the subjects.

(d) This process enables to transform to vitamin D only 0.06% of the provitamins which are present in the culture of yeast, which is a very low efficiency.

(e) It is very difficult to store the vitamin D in crystallized form since it is subject to a rapid oxydation.

The present invention has for its object a method of enrichment of the yeasts in vitamin D according to which one irradiates with the aid of ultra-violet rays provitamins to cause their transformation into vitamins D, characterized by the fact that one forms a yeast paste comprising between 5% and 30% of dry material and that one raises the temperature of it to a temperature comprised between 25 and 45° C., that one irradiates this yeast paste in a homogeneous manner during a time interval comprised between 1 and 10 seconds by means of ultra-violet rays of a wave length of 2537 Angstroms, and that one causes a turbulent flow of this yeast paste during its irradiation, the turbulence of this flow being at least 2400 Reynolds.

The attached drawing shows schematically and by way of example one embodiment of the installation according to the invention.

A particular way of carrying out the method for increasing the yield in vitamin D of the yeasts comprises the following successive operations:

(1) The formation of a yeast paste comprising 5% to 30% of dry material, that is to say a relatively liquid yeast paste. It is interesting to note here that such a yeast paste is obtained during the manufacture of the yeasts so that the obtention of this yeast paste does not present any difficulty.

(2) The raising of the temperature of this yeast paste until the obtention of an optimum viscosity for the subsequent irradiation operation. For example, a yeast paste comprising 15% of dry material in suspension in water has to be brought up to a temperature comprised between 34 and 39° C. to present the desired optimum viscosity. The thicker the yeast paste is, the higher the temperature of it should be so that for the mentioned yeast pastes comprising 5% to 30% of dry material the necessary temperatures vary between 25 and 45° C.

(3) One irradiates in a homogeneous way this yeast paste presenting the viscosity (temperature and percentage of dry material) desired by means of a source of ultra-violet rays of a wave length of 2537 Angstroms.

The sources of ultra-violet rays used are mercury burners the spectre of the emitted energy of which comprises 92% of the wave length of 2537 Angstroms, 4.9% of visible wave lengths and 0.2% of diverse wave lengths.

The energetic intensity of the ultra-violet radiation nearly monochromatic of 2537 Angstroms, is comprised between 12 and 60 microwatts per square centimetre at one metre distance from the source of the said radiation. In general to obtain the wanted result one dose of ultra-violet rays of 37 microwatts per square centimetre has to be absorbed by the molecules of provitamins.

(4) Since the yeast paste is nearly opaque to the ultra-violet rays, it is necessary to cause a stirring of the yeast paste during its irradiation, so that all the molecules of provitamins contained in this yeast paste may be submitted to the irradiation, that is to say may come in the outer layer of the said yeast paste.

To obtain this stirring of the yeast paste, this is circulated in a quartz tube, or any other material practically transparent to the ultra-violet rays, with a turbulence such that all the particles of this paste have statistically the possibility of penetrating the layer contacting the quartz during the time necessary to these particles to cross the irradiation zone.

Numerous tests have permitted to determine the conditions in which this irradiation has to be effected: one has to obtain a turbulence of the yeast paste of at least 2400 Reynolds for the irradiation to be efficient.

The method of increasing the yield in vitamin D of the yeasts shows, with respect to the known processes, very great advantages, the main ones of which are the following:

(a) The provitamins are irradiated in their normal medium, that is to say in a yeast paste. The product obtained is not a highly concentrated product in vitamin D but a yeast paste enriched in a homogeneous way in vitamin D. All the problems of dilution and mixing of the crystallized vitamin D are thus solved at the same time.

(b) It has been possible, in irradiating provitamins in their medium, to use ultra-violet rays of a wave length of 2537 Angstroms and even less. It was generally admitted until now that the photosynthesis of the vitamin D could be obtained only by means of rays of a wave length greater than 2650 Angstroms, generally equal to 2800 Angstroms. The wave lengths lower than 2600 Angstroms were considered as destroying the vitamin D.

Put practical tests realized according to the present method have shown not only that it is possible to realize the photosynthesis of the vitamin D from the provitamins by means of irradiation with the aid of ultra-violet rays of a wave length less than 2600 Angstroms, but also that the product obtained which is enriched in vitamin D is practically free of the intermediates lumisterol and tachysterol which are found in the products of the processes now used.

(c) The efficiency of the enrichment in vitamin D according to the present method is of about 25% as practical tests have shown it, that is about 400 times higher than the efficiency of the known processes (0.06%).

As a matter of fact, with the present method it has been possible by irradiating with ultra-violet rays of 2537 Angstroms of wave length a yeast paste in which 1% by weight of the dry material (representing 15% of the yeast paste) was formed by provitamins, to obtain $10.10^6$ international units of vitamin D per 100 grams of dry material, that is $10.10^6$ international units of vitamin D per gram of activable material, that is, ¼ or 25% of the theoretical equivalent of 1 gram of provitamins which is $40.10^6$ international units of vitamin D.

(d) The provitamins being treated in their medium, the extracting operation and dilution operation necessary until now have been eliminated and this method enables thus to enrich the yeast paste in vitamin D at the minimum cost until now.

This has been shown by practical tests, in cattle breedings, notably where a reduction of the breeding time of about 20% has been achieved while effecting simultaneously an economy of 10 to 15% on the fodder with respect to witness breedings. Furthermore the efficiency in meat of these cattle fed with the fodder enriched in vitamin D was quite superior.

(e) The vitamin D maintained in its medium is preserved from oxydation.

One may vary the enrichment yield in vitamin D by varying the duration of irradiation of the yeast paste. In this way it is possible to realize the optimum enrichment in vitamin D corresponding to the desired biologic effect.

One subsequent advantage of the method is to highly reduce the damage from strontium 90 which can be found in milk.

In fact, it has been verified that the increase of the yield in vitamin D in the blood of the subjects permits to increase their biological affinity to calcium while retaining that of the strontium 90 at its normal value. This leads to a relative lowering of the affinity of the living organisms for the strontium 90 with respect to calcium, which leads to the reduction of the quantity of strontium 90 entering in the metabolism of the living organism and thus to diminish the lesions caused by this strontium 90.

One embodiment of an installation for carrying out the invention is schematically illustrated in the drawing.

The liquid which is inoculated with a yeast prepared in the laboratory is strongly stirred with air which brings the necessary oxygen to the yeast and eliminates the carbonic acid of the product.

One proceeds on the other hand to the optimum adjustment of the concentration, of the temperature, and of the acidity.

The nutritive materials are sufficiently rapidly transformed in the vats that one can simultaneously remove as product a stream of yeast paste free from raw materials, equal to the unyeasted liquid which is introduced.

The yeast is developing constantly in the vats in an emulsionized medium of constant characteristics.

The emulsion undergoes a concentration in yeast cream through centrifugation which eliminates 90 to 92% of the unyeasted liquid. The yeast cream undergoes several washings until it contains 15 to 16% of dry materials.

The figure of the drawing shows an installation for the production of yeast from distillery washes. In this figure, the reference numerals designate the following:

(1) is the supply of prepared liquids
(2) is the ammonia vat
(3) is the fermentation vat
(4) is the aeration device
(5) is the disemulsion vat
(6) are filters
(7) are centrifugal separators
(8) are washing vats
(9) are washing water vats
(10) are washed yeast cream vats
(11) is the enrichment in vitamin D
(12) is a plasmolyser
(13) is an atomizer
(14) is a discharge to cyclones and packing.

To be used as breeding medium, the distilled washes are combined with nutrituve salts, allowed to stay and cool. The introduction of the distilled washes treated as above is made continuously in the vat 3 where the Lefrançois-Mariller fermentation takes place, which is outside the buildings, and which receives the ammonia solution stored in the vat 2 and an injection of air transforms its contents to an emulsion which is highly aerated and which permits the development of the yeast, Once the principal parameters have been fixed (volume, temperature, pH . . ), its operation is entirely automatic.

At the outlet of the vat 3, the liquid is disemulsionated in a vat 5, filtered by means of filters 6 and centrifugated by the centrifugal separators 7. The yeast is extracted in the form of a cream and washed twice in vats 8 by means of washing water. The washed yeast cream is again centrifugated and received in a vat 10, then enriched in vitamin D by means of irradiation with the aid of the device 11, then it is plasmolysed by heating. The irradiated and plasmolysed cream is then dried by atomisation.

The dry yeast is sent to a storage bin in order to be packed and weighed. It is delivered in the form of a powder having a light yellow colour intended to be mixed with the foods of animals.

The irradiation device 11 or enrichment device of the vitamin D is constituted by a battery of tubes made of quartz in which the yeast paste is sent at a sufficient speed, 1.6 meters per second for example, to obtain a turbulence of 2400 Reynolds at least. During its passage in these tubes the yeast paste is irradiated by means of mercury lamps delivering a radiation, 92% of which has a wave length of 2537 Angstroms. The length of the tubes of the device is such that the period of irradiation is comprised between 1 and 10 seconds.

The use of the yeasts enriched in vitamins D thus obtained may be very varied, in the form of fodder yeast or in the form of bread making yeast so that they can serve for the feeding of the animals as well as for the alimentation of human beings. The preparation of the fodder products or of the food with the aid of these yeasts is made by means of well-known methods which will not be described here.

A particular application of the process is the production of yeasts enriched in vitamin D from petroleum products.

I claim:

1. A method for increasing the vitamin D content of yeast, comprising forming a paste of yeast in its growing medium containing between 5 to 30% of dry material, irradiating said paste for one to 10 seconds with ultra-violet rays of a wave length of 2537 Angstroms at a temperature between 25 and 45° C., and maintaining said paste in turbulent flow in contact with a surface transparent to said ultraviolet rays and through which said ultraviolet rays pass during said irradiation, the turbulence of said flow being at least 2400 Reynolds.

2. A method as claimed in claim 1, the energy of said ultraviolet irradiation being between 12 and 60 microwatts per square centimeter, as measured at a distance of one meter from the source of said ultraviolet irradiation.

References Cited

UNITED STATES PATENTS

| | | | |
|---|---|---|---|
| 2,099,025 | 11/1937 | Light et al. | 204—159 |
| 2,243,632 | 5/1941 | Johnson | 204—159 |

HOWARD S. WILLIAMS, Primary Examiner